US011750055B2

(12) United States Patent
Lee et al.

(10) Patent No.: US 11,750,055 B2
(45) Date of Patent: Sep. 5, 2023

(54) TERMINAL ASSEMBLY OF A DRIVING MOTOR

(71) Applicants: HYUNDAI MOTOR COMPANY, Seoul (KR); KIA CORPORATION, Seoul (KR)

(72) Inventors: Ga Eun Lee, Seongnam-si (KR); Seong Jun Park, Seongnam-si (KR); Dong Yeon Han, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 128 days.

(21) Appl. No.: 17/538,925

(22) Filed: Nov. 30, 2021

(65) Prior Publication Data

US 2022/0329123 A1 Oct. 13, 2022

(30) Foreign Application Priority Data

Apr. 13, 2021 (KR) ........................ 10-2021-0047672

(51) Int. Cl.
*H02K 3/28* (2006.01)
*H02K 5/22* (2006.01)

(52) U.S. Cl.
CPC ............... *H02K 3/28* (2013.01); *H02K 5/225* (2013.01); *H02K 2203/09* (2013.01)

(58) Field of Classification Search
CPC ....................... H02K 2203/09; H02K 2203/12
See application file for complete search history.

(56) References Cited

FOREIGN PATENT DOCUMENTS

CN 102782994 B * 5/2015 ............. H02K 1/278

* cited by examiner

*Primary Examiner* — Ramon M Barrera
(74) *Attorney, Agent, or Firm* — LEMPIA SUMMERFIELD KATZ LLC (57) ABSTRACT

A terminal assembly of a driving motor includes: a support ring surrounding a stator core to which bobbins are coupled, the bobbins being configured to allow stator coils to be wound thereon; a first sub-assembly disposed on the support ring to surround the bobbins; and a second sub-assembly connected to the first sub-assembly, the second sub-assembly including fixing portions inserted into coupling recesses formed in the bobbins. Three-phase bus bars connected to three-phase lead wires of the stator coils are inserted into the first sub-assembly and an N-phase bus bar connected to N-phase lead wires of the stator coils is inserted into the second sub-assembly.

16 Claims, 7 Drawing Sheets

DIRECTION IN
WHICH ROTARY SHAFT
IS CONNECTED

DIRECTION IN
WHICH ROTARY SHAFT
IS CONNECTED

TERMINAL ASSEMBLY OF A DRIVING MOTOR

CROSS-REFERENCE TO RELATED APPLICATION

This application claims under 35 U.S.C. § 119(a) the benefit of priority from Korean Patent Application No. 10-2021-0047672 filed on Apr. 13, 2021, the entire contents of which are incorporated herein by reference.

BACKGROUND

(a) Technical Field

The present disclosure relates to a terminal assembly of a driving motor, which is provided with two sub-assemblies, into which bus bars are inserted for connection to stator coils.

(b) Background Art

In general, hybrid vehicles or electric vehicles, which are environment-friendly vehicles, may generate drive force using a driving motor, which acquires torque from electric energy. Hybrid vehicles are driven in an electric vehicle (EV) mode, which is a pure electric vehicle mode using only the power of a driving motor or are driven in a hybrid electric vehicle (HEV) mode, which uses torque from both an engine and a driving motor as power. General electric vehicles are driven using torque from a driving motor as power.

A driving motor applied to environment-friendly vehicles includes a stator and a rotor. For example, the stator is fixedly mounted in a motor housing and the rotor is disposed within the stator at a predetermined distance from the stator. The stator of the driving motor includes a stator core, which is formed by stacking electric steel sheets, and coils, which are wound in slots of the stator core. When alternating current is applied to the coils, a rotation magnetic field is generated in the stator, and rotation torque is generated in the rotor by the rotation magnetic field.

A general driving motor for environment-friendly vehicles requires an annular terminal for insulation between bus bars and for connection of stator coils. The annular terminal is provided with an insulation structure for insulation between bus bars and a connection structure for connection of stator coils.

However, because the annular terminal is located on the stator core, the height of the driving motor increases in proportion to the height of the annular terminal. Additional processing (e.g., manufacturing steps) is required for insulation in the annular terminal.

The above information disclosed in this Background section is only to enhance understanding of the background of the disclosure. Therefore, the Background section may contain information that does not form the related art that is already known in this country to a person of ordinary skill in the art.

SUMMARY

The present disclosure has been made in an effort to solve the above-described problems associated with the related art. It is an object of the present disclosure to provide a terminal assembly of a driving motor, which is provided with two sub-assemblies, into which bus bars are inserted for connection to stator coils.

It is another object of the present disclosure to provide a driving motor in which a terminal assembly for connecting lead wires of stator coils to bus bars is disposed radially outside bobbins, thereby reducing the overall height of the driving motor.

In one aspect, the present disclosure provides a terminal assembly of a driving motor. The terminal assembly of a driving motor includes: a support ring surrounding a stator core to which bobbins are coupled, the bobbins being configured to allow stator coils to be wound thereon; a first sub-assembly disposed on the support ring to surround the bobbins; and a second sub-assembly connected to the first sub-assembly. The second sub-assembly includes fixing portions inserted into coupling recesses formed in the bobbins. Three-phase bus bars connected to three-phase lead wires of the stator coils are inserted into the first sub-assembly and an N-phase bus bar connected to N-phase lead wires of the stator coils is inserted into the second sub-assembly.

In an embodiment, the second sub-assembly may be disposed between the first sub-assembly and the stator coils.

In another embodiment, the first sub-assembly may have first holes, second holes, and third holes formed therethrough to connect the three-phase lead wires to the three-phase bus bars. The three-phase lead wires may be connected to the three-phase bus bars through the first holes, the second holes, and the third holes.

In still another embodiment, the first holes, the second holes, and the third holes may be formed at different heights. U-phase lead wires, V-phase lead wires, and W-phase lead wires constituting the three-phase lead wires may respectively pass through the first holes, the second holes, and the third holes.

In yet another embodiment, the three-phase lead wires may pass through portions of the coupling recesses that are not occupied by the fixing portions.

In still yet another embodiment, the second sub-assembly may have fourth holes formed therein to expose portions of the N-phase bus bar in order to connect the N-phase lead wires to the N-phase bus bar.

In a further embodiment, the N-phase bus bar may include coil bonding portions exposed through the fourth holes and the coil bonding portions may be connected to the N-phase lead wires.

In another further embodiment, the fourth holes may be formed at positions higher than the first holes, the second holes, and the third holes based on the surface of the first sub-assembly that is in contact with the support ring.

In still another further embodiment, the first sub-assembly and the second sub-assembly may be disposed outside the bobbins based on the rotary shaft of the driving motor.

In yet another further embodiment, ends of the first sub-assembly and the second sub-assembly may be located at the same height in the direction in which the rotary shaft of the driving motor extends.

In still yet another further embodiment, the fixing portions may protrude from the second sub-assembly toward the rotary shaft of the driving motor. Each of the fixing portions may include a first fixing portion, connected to the second sub-assembly, and a second fixing portion, connected to the first fixing portion, the second fixing portion having one end divided into two pieces.

In a still further embodiment, the second sub-assembly may include protruding portions protruding in the direction in which the rotary shaft of the driving motor extends. The protruding portions may be inserted into insertion holes formed in the first sub-assembly to couple the first sub-assembly and the second sub-assembly to each other.

In a yet still further embodiment, the insertion holes may be formed in an extension portion extending from a body portion of the first sub-assembly toward the rotary shaft of the driving motor.

In a yet still further embodiment, the three-phase lead wires may be drawn out through the gap between the extension portion of the first sub-assembly and the second sub-assembly and may be connected to the three-phase bus bars.

In a yet still further embodiment, the bobbins may have guide recesses formed therein to guide the N-phase lead wires.

In a yet still further embodiment, based on the rotary shaft of the driving motor, points at which the three-phase lead wires and the three-phase bus bars are connected to each other may be located at a position further outward than points at which the N-phase lead wires and the N-phase bus bar are connected to each other.

The above and other aspects, features, and embodiments of the disclosure are discussed herein.

BRIEF DESCRIPTION OF THE DRAWINGS

The above and other features of the present disclosure are described in detail with reference to certain embodiments thereof, illustrated in the accompanying drawings, which are given hereinbelow by way of illustration only, and thus are not imitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Advantages and features of the present disclosure and methods for achieving them should be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and to fully convey the scope of the disclosure to those having ordinary skill in the art. The present disclosure is defined only by the scope of the claims. Throughout the specification, the same reference numerals represent the same components.

Additionally, terms such as "first", "second", etc. may be used herein to describe the components of the embodiments. These terms are only used to distinguish one element from another element, and the essence, order, or sequence of corresponding elements is not limited by these terms.

The detailed description is illustrative of the present disclosure. Also, the disclosure is intended to illustrate and explain several embodiments of the present inventive concept. The present disclosure may be implemented in various other combinations, modifications, and environments. In other words, the present disclosure may be changed or modified within the scope of the inventive concept disclosed herein, within the equivalent scope of the disclosure, and/or within the skill and knowledge of one having ordinary skill in the art. The described embodiments illustrate a state of the art to implement the technical idea of the present disclosure, and various changes may be made thereto as demanded for specific applications and uses of the present disclosure. Accordingly, the detailed description is not intended to limit the present disclosure to the embodiments. Also, the appended claims should be construed as encompassing such other embodiments.

When a component, device, element, or the like of the present disclosure is described as having a purpose or performing an operation, function, or the like, the component, device, or element should be considered herein as being "configured to" meet that purpose or to perform that operation or function.

Figure 1:
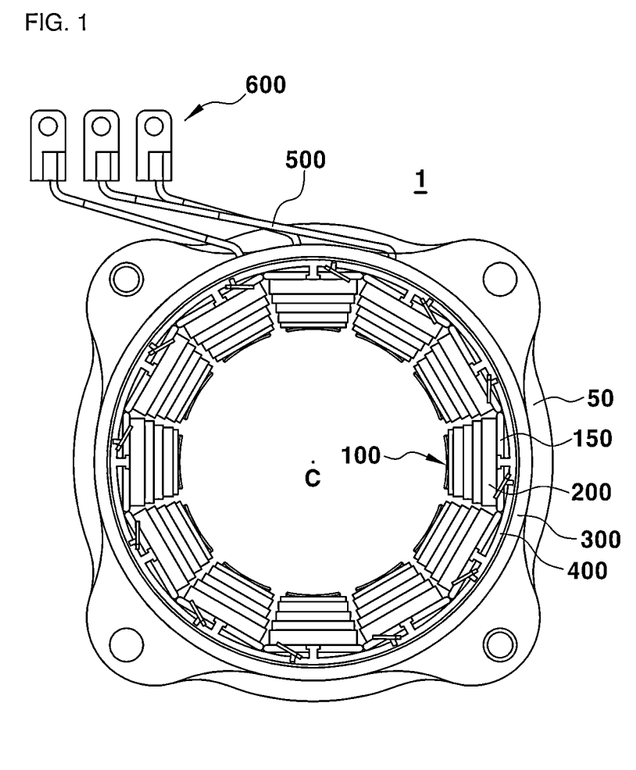
FIG. 1 is a view showing a terminal assembly of a driving motor according to an embodiment of the present disclosure.

FIG. 1 is a view showing a terminal assembly of a driving motor according to an embodiment of the present disclosure.

Referring to FIG. 1, a terminal assembly 1 of a driving motor may include a support ring 50, a first sub-assembly 300, and a second sub-assembly 400. The terminal assembly 1 may be configured to connect stator coils 200 to a plurality of bus bars (not shown), which are provided corresponding to the phases U, V, W, and N of a power supply.

The support ring 50 may be disposed so as to surround a plurality of bobbins 150 on which the stator coils 200 are wound. In other words, the support ring 50 may be disposed so as to surround a stator core 100 and may be in contact with the stator core 100. The bobbins 150 may be coupled to the stator core 100 and may be arranged in the circumferential direction of a rotary shaft C of the driving motor.

The first sub-assembly 300 may be disposed on the support ring 50 and the stator core 100 in the direction in which the rotary shaft C of the driving motor extends. The first sub-assembly 300 may be disposed so as to surround the bobbins 150. The first sub-assembly 300 and the bobbins 150 may be spaced a predetermined distance apart from each other in the radial direction of the rotary shaft C of the driving motor. Three-phase (U, W, V) bus bars (not shown), which are connected to three-phase (U, W, V) lead wires of the stator coils 200, may be inserted into the first sub-assembly 300. The three-phase bus bars (not shown) are described later.

The second sub-assembly 400 may be disposed in the space between the bobbins 150 and the first sub-assembly 300. The second sub-assembly 400 may be physically connected and fixed to the first sub-assembly 300 and the bobbins 150. The second sub-assembly 400 may be spaced a predetermined distance apart from the first sub-assembly 300 in the radial direction of the rotary shaft C of the driving motor. An N-phase bus bar (not shown), which is connected to N-phase lead wires of the stator coils 200, may be inserted into the second sub-assembly 400. The N-phase bus bar (not shown) will be described later.

The three-phase bus bars (not shown) inserted into the first sub-assembly 300 may be connected to the three-phase (U, W, V) lead wires 500. The three-phase lead wires 500 may transmit current applied from the outside to the three-phase bus bars (not shown). In order to apply current to the three-phase lead wires 500, phase terminals 600 may be provided so as to be connected to the three-phase lead wires 500.

Figure 2:
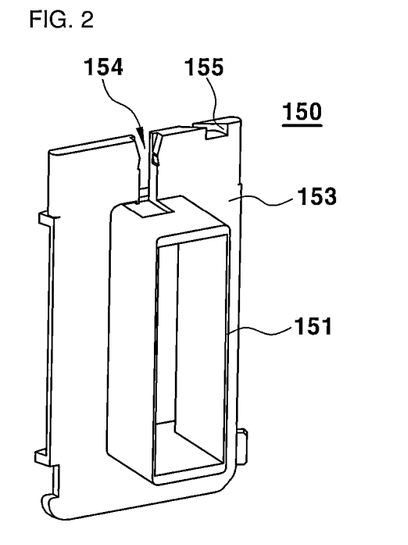
FIG. 2 is a view showing a bobbin according to an embodiment of the present disclosure.

FIG. 2 is a view showing the bobbin according to an embodiment of the present disclosure.

Referring to FIGS. 1 and 2, the bobbin 150 may be divided into a first portion 151, which surrounds each of teeth protruding from the stator core 100, and a second portion 153, which is connected to the first portion 151. The second portion 153 may have a plate shape and the first portion 151 may have a rectangular parallelepiped shape having therein a hollow portion through which each of the teeth passes. In other words, the first portion 151 may have a shape in which four plates extending from the second portion 153 are connected to each other. Each of the teeth may be inserted into the hollow portion defined by the inner surface of the first portion 151, and the stator coils 200 may be wound on the outer surface of the first portion 151.

The second portion 153 may have therein a coupling recess 154, which is coupled to a fixing portion (not shown) of the second sub-assembly 400, and a guide recess 155, which guides the N-phase lead wires (not shown). When the fixing portion (not shown) of the second sub-assembly 400 is inserted into the coupling recess 154 and a portion of the coupling recess 154 may remain as an empty space. The three-phase lead wire (not shown) may pass through the unoccupied space in the coupling recess 154.

Figure 3:
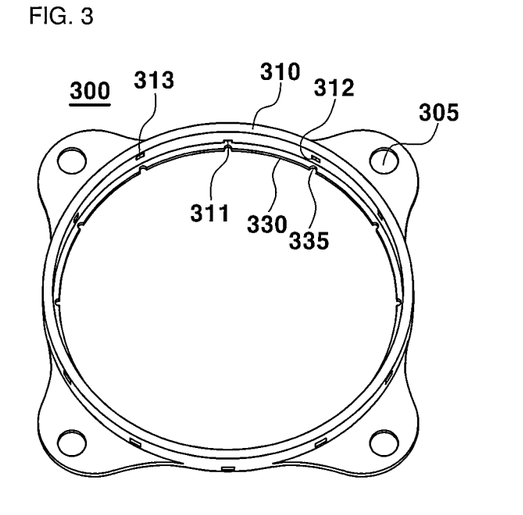
FIG. 3 is a view showing a first sub-assembly according to an embodiment of the present disclosure.
Figure 4:
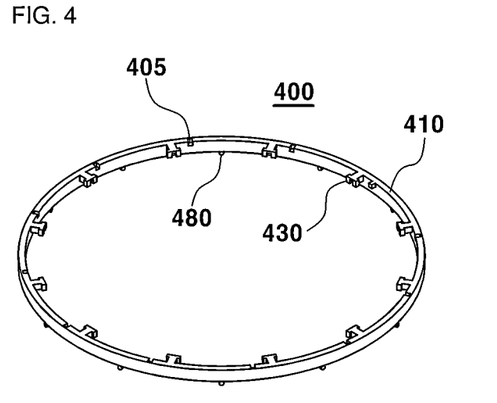
FIG. 4 is a view showing a second sub-assembly according to an embodiment of the present disclosure.

FIG. 3 is a view showing the first sub-assembly according to an embodiment of the present disclosure. FIG. 4 is a view showing the second sub-assembly according to an embodiment of the present disclosure.

Referring to FIGS. 1-4, the first sub-assembly 300 may include a body portion 310 and an extension portion 330. The body portion 310 of the first sub-assembly 300 may be generally ring-shaped. The extension portion 330 may extend from the lower end of the body portion 310 toward the rotary shaft C of the driving motor. In this case, the lower end of the body portion 310 of the first sub-assembly 300 may be the end of the body portion 310 that is adjacent to the contact point between the body portion 310 and the support ring 50 or the contact point between the body portion 310 and the stator core 100.

The second sub-assembly 400 may include a body portion 410, fixing portions 430, and protruding portions 480. The body portion 410 of the second sub-assembly 400 may have a ring shape. The fixing portions 430 may protrude from the body portion 410 of the second sub-assembly 400 toward the rotary shaft C of the driving motor. The number of fixing portions 430 may be the same as the number of bobbins 150. Each of the fixing portions 430 may be inserted into the coupling recess 154 in a corresponding bobbin 150, whereby the bobbin 150 and the second sub-assembly 400 may be fixed. The protruding portions 480 may protrude in the direction in which the rotary shaft C of the driving motor extends. In other words, the protruding portions 480 may protrude toward the stator core 100. The number of protruding portions 480 may be the same as the number of bobbins 150 or the number of fixing portions 430. Each of the protruding portions 480 may be disposed between two adjacent ones of the fixing portions 430.

The body portion 310 of the first sub-assembly 300 may have therein holes 311, 312 and 313 to expose the three-phase bus bars (not shown). The holes 311, 312 and 313 may include first holes 311, second holes 312, and third holes 313, which are formed at different heights so that the U-phase lead wires, the V-phase lead wires, and the W-phase lead wires constituting the three-phase lead wires (not shown) respectively pass through the same. The first holes 311, the second holes 312, and the third holes 313 may be formed so as to penetrate the body portion 310 of the first sub-assembly 300. The three-phase bus bars (not shown) exposed through one surface of the body portion 310 of the first sub-assembly 300 may be connected to the three-phase lead wires (not shown). The three-phase bus bars (not shown) exposed through the opposite surface of the body portion 310 of the first sub-assembly 300 may be connected to the three-phase lead wires 500 for application of external current. In this case, the one surface of the body portion 310 of the first sub-assembly 300 may be the surface that faces the rotary shaft C of the driving motor. The opposite surface of the body portion 310 of the first sub-assembly 300 may be the surface that is opposite the one surface.

In one example, the first holes 311 may be formed in the lower end of the body portion 310, the second holes 312 may be formed in the middle of the body portion 310, and the third holes 313 may be formed in the upper end of the body portion 310. In this case, the upper end of the body portion 310 may be the end that is farthest from the stator core 100 in the direction in which the rotary shaft C of the driving motor extends. The three-phase lead wires (not shown) and the three-phase bus bars (not shown) may be connected to each other through the first holes 311, the second holes 312, and the third holes 313.

Insertion holes 335 may be formed in the extension portion 330 of the first sub-assembly 300. The protruding portions 480 of the second sub-assembly 400 may be inserted into the insertion holes 335. The first sub-assembly 300 and the second sub-assembly 400 may be connected to each other through the insertion of the protruding portions 480 into the insertion holes 335. In other words, the second sub-assembly 400 may be fixed to the upper side of the extension portion 330 of the first sub-assembly 300. A predetermined gap may be formed between the extension portion 330 of the first sub-assembly 300 and the lower end of the second sub-assembly 400. The three-phase lead wires (not shown) may be drawn out through the gap between the extension portion 330 of the first sub-assembly 300 and the second sub-assembly 400 and may be connected to the three-phase bus bars.

The second sub-assembly 400 may have coil bonding portions 455, which are connected to the N-phase bus bar (not shown), and fourth holes 405 formed therein to expose the coil bonding portions 455. The coil bonding portions 455 may be connected to the N-phase lead wires (not shown). In other words, the fourth holes 405 may expose portions of the N-phase bus bar (not shown), and the coil bonding portions 455 exposed through the fourth holes 405 may be connected to the N-phase lead wires (not shown).

The fourth holes 405 may be formed at positions higher than the first holes 311, the second holes 312, and the third holes 313 based on the surface of the first sub-assembly 300 that is in contact with the support ring 50.

The first sub-assembly 300 may have therein fifth holes 305 for connection to the support ring 50. The first sub-assembly 300 and the support ring 50 may be connected to each other through bolt fastening through the fifth holes 305.

The first sub-assembly 300 may have a larger width than the second sub-assembly 400 in the direction in which the rotary shaft C of the driving motor extends. In addition, the ring-shaped first sub-assembly 300 may have a larger diameter than the ring-shaped second sub-assembly 400. Accordingly, the second sub-assembly 400 may be inserted into the first sub-assembly 300.

Figure 5:
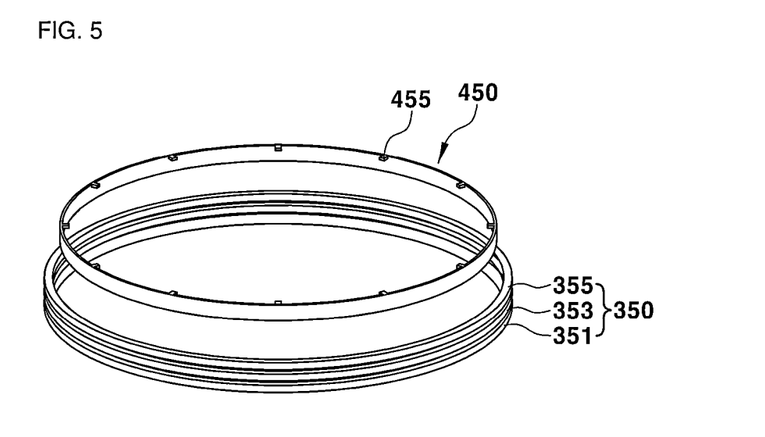
FIG. 5 is a view showing bus bars according to an embodiment of the present disclosure.

FIG. 5 is a view showing the bus bars according to an embodiment of the present disclosure.

Referring to FIGS. 1-5, the three-phase bus bars 350 may be inserted into the first sub-assembly 300 and the N-phase bus bar 450 may be inserted into the second sub-assembly 400. The three-phase bus bars 350 and the N-phase bus bar 450 may have ring shapes.

The three-phase bus bars 350 may include a U-phase bus bar 351, a W-phase bus bar 353, and a V-phase bus bar 355. However, the positions at which the U-phase bus bar 351, the W-phase bus bar 353, and the V-phase bus bar 355 are disposed are not limited to what is illustrated in the drawings.

In one example, the U-phase bus bar 351 may be exposed by first holes 311 formed in the body portion 310 of the first sub-assembly 300, the W-phase bus bar 353 may be exposed by the second holes 312 formed in the body portion 310 of the first sub-assembly 300, and the V-phase bus bar 355 may be exposed by the third holes 313 formed in the body portion 310 of the first sub-assembly 300. The portions of the U-phase bus bar 351, the W-phase bus bar 353, and the V-phase bus bar 355 that are exposed by the first holes 311, the second holes 312, and the third holes 313 may be connected to the three-phase lead wires (not shown).

The N-phase bus bar 450 may include coil bonding portions 455. The coil bonding portions 455 may protrude from the ring-shaped N-phase bus bar 450 toward the rotary shaft C of the driving motor. The coil bonding portions 455 may be connected to the N-phase lead wires (not shown).

The ring-shaped three-phase bus bars 350 may have larger diameters than the ring-shaped N-phase bus bar 450.

Figure 6:
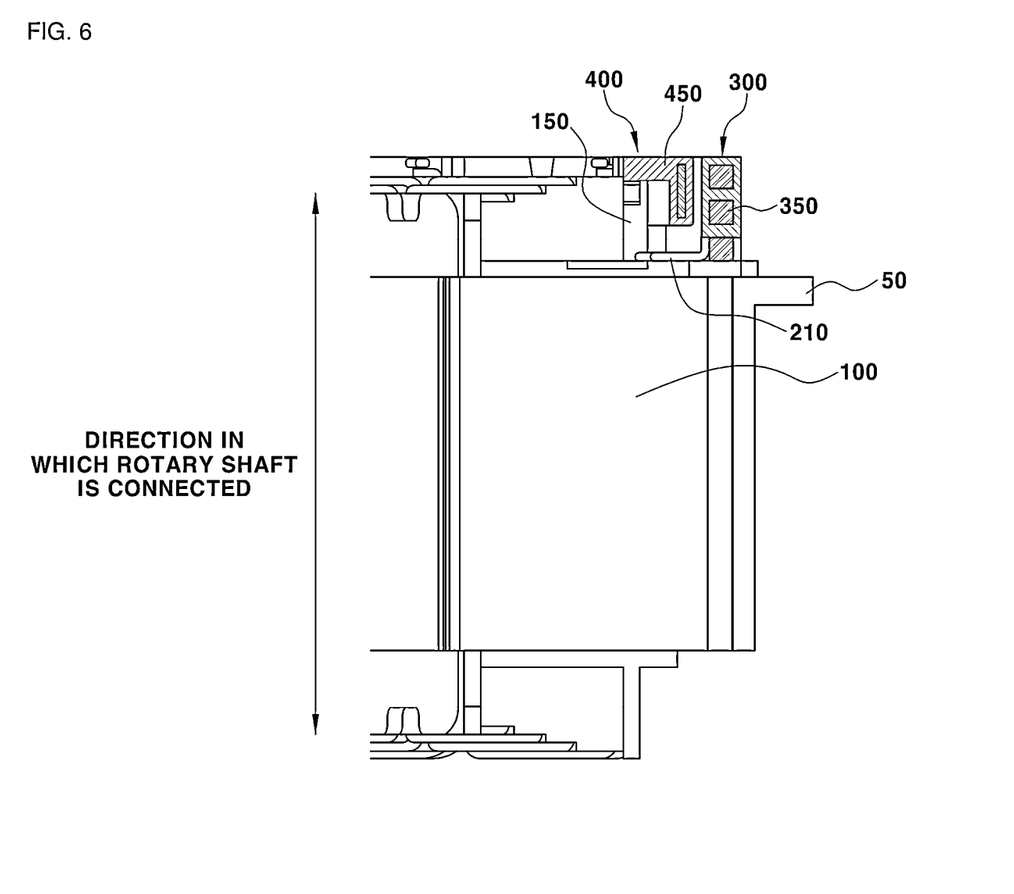
FIG. 6 is a cross-sectional view of a stator of the driving motor including the terminal assembly according to an embodiment of the present disclosure.

FIG. 6 is a cross-sectional view of the stator of the driving motor including the terminal assembly according to an embodiment of the present disclosure. FIG. 6 shows the connection relationships among the first sub-assembly, the second sub-assembly, and a bobbin.

Referring to FIGS. 1-6, the support ring 50 may be disposed outside the stator core 100 based on the rotary shaft C of the driving motor. The first sub-assembly 300 may be disposed on the stator core 100 and the support ring 50 and the bobbin 150 may be disposed on the stator core 100. The second sub-assembly 400 may be disposed between the first sub-assembly 300 and the stator coils 200. Also, the second sub-assembly 400 may be disposed between the first sub-assembly 300 and the bobbin 150. The second sub-assembly 400 may be disposed on the first sub-assembly 300 such that the protruding portions 480 of the second sub-assembly 400 are inserted into the insertion holes 335 in the first sub-assembly 300.

The first sub-assembly 300 and the second sub-assembly 400 may be disposed outside the stator coils 200 or the bobbin 150 based on the rotary shaft C of the driving motor. In addition, the ends of the first sub-assembly 300 and the second sub-assembly 400 may be located at the same height in the direction in which the rotary shaft C of the driving motor extends.

The stator coils 200 may be drawn out through the coupling recesses 154 in the bobbins 150 and the drawn-out stator coils 200 may be defined as three-phase lead wires 210. The stator coils 200 may be drawn out through the guide recesses 155 in the bobbins 150 and the drawn-out stator coils 200 may be defined as N-phase lead wires 230. The three-phase lead wires 210 may be drawn out through the space between the first sub-assembly 300 and the second sub-assembly 400 and may be connected to the three-phase bus bars 350. Based on the surface of the stator core 100 that joins the first sub-assembly 300, the points at which the N-phase lead wires 230 and the coil bonding portions 455 of the N-phase bus bar 450 are connected to each other may be located at a position higher than the points at which the three-phase lead wires 210 and the three-phase bus bars 350 are connected to each other. Further, based on the rotary shaft C of the driving motor, the points at which the three-phase lead wires 210 and the three-phase bus bars 350 are connected to each other may be located at a position further outward than the points at which the N-phase lead wires 230 and the N-phase bus bar 450 are connected to each other.

According to an embodiment of the present disclosure, a structure for connecting the three-phase lead wires 210 and the N-phase lead wires 230, which are drawn out from the stator coils 200, to the bus bars 350 and 450 is disposed radially outside the bobbins 150, rather than on the bobbins 150, whereby the overall height of the driving motor may be reduced. In other words, in the case in which a structure for connecting the lead wires 210 and 230 to the bus bars 350 and 450 is disposed on the stator coils 200, which are disposed on the stator core 100, it is not possible to avoid an increase in the overall height of the driving motor due to the structure. In contrast, according to the terminal assembly 1 of the present disclosure, the structure for connecting the lead wires to the bus bars is disposed on the stator core 100 at a height similar to that of the stator coils 200.

FIGS. 7-10 are views showing a process of assembling the terminal assembly according to an embodiment of the present disclosure.

Figure 7:
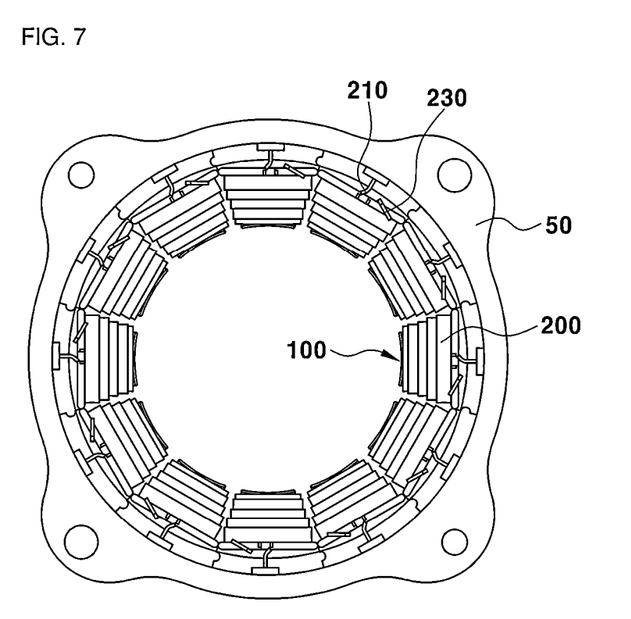
FIGS. 7-10 are views showing a process of assembling the terminal assembly according to an embodiment of the present disclosure.

Referring to FIG. 7, the bobbins 150 may be engaged with the teeth formed in the stator core 100. The stator coils 200 may then be wound around the bobbins 150.

After the stator coils 200 are completely wound, the support ring 50 may be placed so as to tightly surround the stator core 100. After completion of winding of the stator coils 200, the lead wires 210 and 230 of the stator coils 200 may be located on the bobbins 150.

Figure 8:
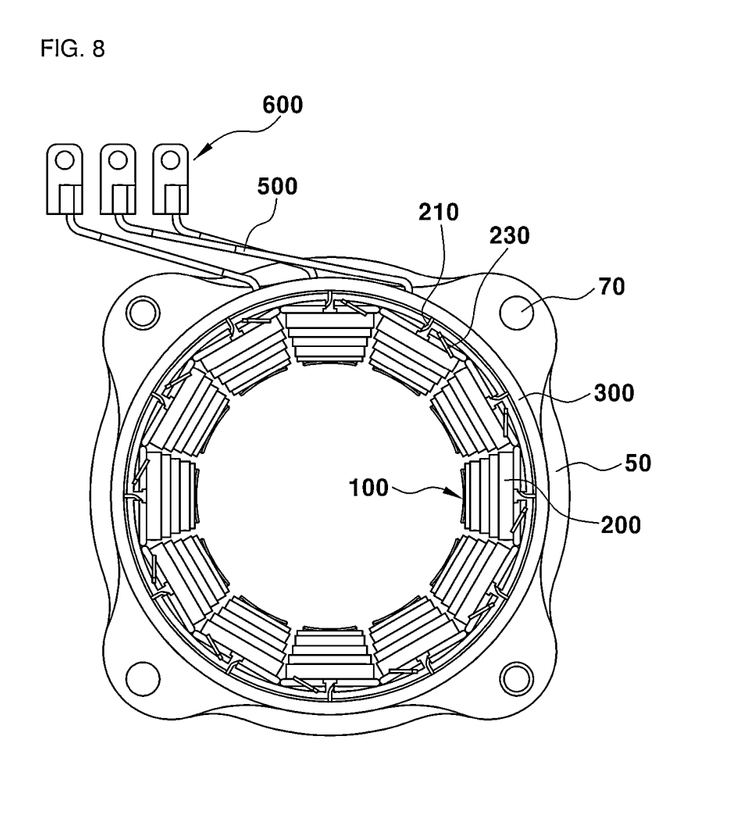

Referring to FIG. 8, the first sub-assembly 300 may be disposed on the support ring 50. The first sub-assembly 300 and the support ring 50 may be connected to each other using bolts 70. The three-phase lead wires 210 may be connected to the three-phase bus bars (not shown) inserted into the first sub-assembly 300. The three-phase bus bars (not shown) may be connected to the three-phase lead wires 500 and may receive current from the outside. For example, the three-phase lead wires 210 and the three-phase bus bars (not shown) may be connected using a resistance welding method in which welding is performed thereon by applying current thereto after pressing the same. However, the disclosure is not limited to any specific method of bonding the three-phase lead wires 210 and the three-phase bus bars (not shown) to each other.

Figure 9:
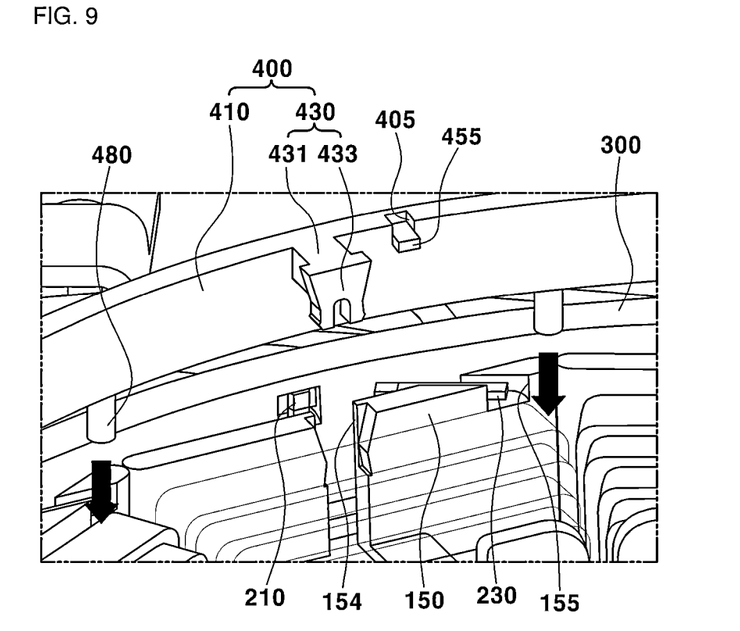

Referring to FIG. 9, the second sub-assembly 400 may be disposed on the first sub-assembly 300. The protruding portions 480 of the second sub-assembly 400 may be inserted into the insertion holes (not shown) in the first sub-assembly 300. In this case, the three-phase lead wires 210 may be connected to the three-phase bus bars (not shown) and the N-phase lead wires 230 may be supported in the guide recesses 155 in the bobbins 150.

The second sub-assembly 400 may include fixing portions 430 for coupling to the bobbins 150. Each of the fixing portions 430 may include a first fixing portion 431, which is connected to the body portion 410 of the second sub-assembly 400, and a second fixing portion 433, which is connected to the first fixing portion 431. One end of the second fixing portion 433 may be divided into two pieces.

Figure 10:
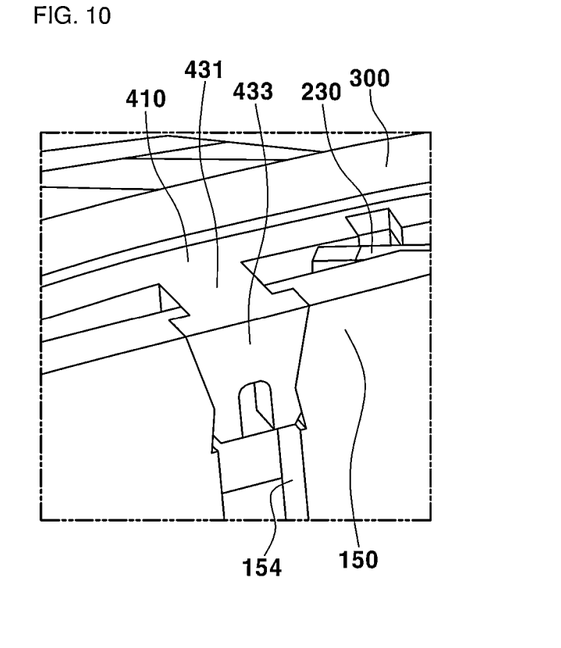

Referring to FIG. 10, when the second fixing portion 433 is inserted into the coupling recess 154 in the bobbin 150, the end of the second fixing portion 433, which is divided into two pieces, may apply pressure to the bobbin 150 so that the fixing portion 430 is not easily separated from the coupling recess 154. In other words, one end of the second fixing portion 433 may be fitted into the coupling recess 154. The two pieces resulting from division of the one end of the second fixing portion 433 may apply pressure to the surfaces of the bobbin 150 that are exposed by the coupling recess 154.

After the second sub-assembly 400 is coupled to the first sub-assembly 300 and the bobbin 150, the N-phase lead wires 230 may be connected to the coil bonding portions 455. For example, the N-phase lead wires 230 and the coil bonding portions 455 may be connected using a resistance welding method in which welding is performed thereon by applying current thereto after pressing the same. However, the disclosure is not limited to any specific method of bonding the N-phase lead wires 230 and the coil bonding portions 455 to each other.

Referring to FIGS. 7-10, when the first sub-assembly 300 and the second sub-assembly 400 are mounted on the support ring 50, the body portion 310 of the first sub-assembly 300 and the body portion 410 of the second sub-assembly 400 may be spaced a predetermined distance apart from each other in the radial direction of the rotary shaft of the driving motor or based on the center of the stator core 100. Also, the body portion 410 of the second sub-assembly 400 and the bobbin 150 may be spaced a predetermined distance apart from each other in the radial direction of the rotary shaft of the driving motor or based on the center of the stator core 100. The second sub-assembly 400 may be fixedly coupled to the bobbin 150 by the fixing portions 430 and may be fixedly coupled to the first sub-assembly 300 by the protruding portions 480. The three-phase lead wires 210 may be bonded to the three-phase bus bars (not shown) through the gap between the body portion 310 of the first sub-assembly 300 and the body portion 410 of the second sub-assembly 400. Also, the N-phase lead wires 210 may be bonded to the coil bonding portions 455 of the N-phase bus bar (not shown) through the gap between the body portion 410 of the second sub-assembly 400 and the bobbin 150. Accordingly, the three-phase lead wires 210 and the N-phase lead wires 230 are not bonded to the bus bars (not shown) in the region above the bobbin 150 in the direction in which the rotary shaft of the driving motor extends but are instead bonded to the bus bars (not shown) in the region outside the bobbin 150 in the radial direction of the rotary shaft of the driving motor. As a result, it is possible to reduce the height of the driving motor in the direction in which the rotary shaft of the driving motor extends.

As should be apparent from the above description, according to an embodiment of the present disclosure, a structure (a terminal assembly) for connecting three-phase lead wires and N-phase lead wires, which are drawn out from stator coils, to bus bars is disposed radially outside bobbins, rather than on the bobbins, whereby the overall height of a driving motor may be reduced.

The inventive concept of the disclosure has been described in detail with reference to embodiments thereof. However, it should be appreciated by those having ordinary skill in the art that changes may be made in these embodiments without departing from the principles and spirit of the disclosure, the scope of which is defined in the appended claims and their equivalents.

What is claimed is:

1. A terminal assembly of a driving motor, the terminal assembly comprising:
   a support ring surrounding a stator core to which bobbins are coupled, the bobbins being configured to allow stator coils to be wound thereon;
   a first sub-assembly disposed on the support ring to surround the bobbins; and
   a second sub-assembly connected to the first sub-assembly, the second sub-assembly comprising fixing portions inserted into coupling recesses formed in the bobbins,
   wherein three-phase bus bars connected to three-phase lead wires of the stator coils are inserted into the first sub-assembly, and
   wherein an N-phase bus bar connected to N-phase lead wires of the stator coils is inserted into the second sub-assembly.

2. The terminal assembly of claim 1, wherein the second sub-assembly is disposed between the first sub-assembly and the stator coils.

3. The terminal assembly of claim 1, wherein the first sub-assembly has first holes, second holes, and third holes formed therethrough to connect the three-phase lead wires to the three-phase bus bars, and
   wherein the three-phase lead wires are connected to the three-phase bus bars through the first holes, the second holes, and the third holes.

4. The terminal assembly of claim 3, wherein the first holes, the second holes, and the third holes are formed at different heights, and
   wherein U-phase lead wires, V-phase lead wires, and W-phase lead wires constituting the three-phase lead wires respectively pass through the first holes, the second holes, and the third holes.

5. The terminal assembly of claim 3, wherein the three-phase lead wires pass through portions of the coupling recesses that are not occupied by the fixing portions.

6. The terminal assembly of claim 3, wherein the second sub-assembly has fourth holes formed therein to expose portions of the N-phase bus bar in order to connect the N-phase lead wires to the N-phase bus bar.

7. The terminal assembly of claim 6, wherein the N-phase bus bar comprises coil bonding portions exposed through the fourth holes, and
   wherein the coil bonding portions are connected to the N-phase lead wires.

8. The terminal assembly of claim 6, wherein the fourth holes are formed at positions higher than the first holes, the second holes, and the third holes based on a surface of the first sub-assembly that is in contact with the support ring.

9. The terminal assembly of claim 1, wherein the first sub-assembly and the second sub-assembly are disposed outside the bobbins based on a rotary shaft of the driving motor.

10. The terminal assembly of claim 1, wherein ends of the first sub-assembly and the second sub-assembly are located at a same height in a direction in which a rotary shaft of the driving motor extends.

11. The terminal assembly of claim 1, wherein the fixing portions protrude from the second sub-assembly toward a rotary shaft of the driving motor, and
wherein each of the fixing portions comprises a first fixing portion, connected to the second sub-assembly, and a second fixing portion, connected to the first fixing portion, the second fixing portion having one end divided into two pieces.

12. The terminal assembly of claim 1, wherein the second sub-assembly comprises protruding portions protruding in a direction in which a rotary shaft of the driving motor extends, and
wherein the protruding portions are inserted into insertion holes formed in the first sub-assembly to couple the first sub-assembly and the second sub-assembly to each other.

13. The terminal assembly of claim 12, wherein the insertion holes are formed in an extension portion extending from a body portion of the first sub-assembly toward the rotary shaft of the driving motor.

14. The terminal assembly of claim 13, wherein the three-phase lead wires are drawn out through a gap between the extension portion of the first sub-assembly and the second sub-assembly and are connected to the three-phase bus bars.

15. The terminal assembly of claim 1, wherein the bobbins have guide recesses formed therein to guide the N-phase lead wires.

16. The terminal assembly of claim 1, wherein, based on a rotary shaft of the driving motor, points at which the three-phase lead wires and the three-phase bus bars are connected to each other are located at a position further outward than points at which the N-phase lead wires and the N-phase bus bar are connected to each other.

* * * * *